(12) United States Patent
Mayatskikh

(10) Patent No.: US 9,983,832 B1
(45) Date of Patent: May 29, 2018

(54) STORAGE PROCESSOR WITH DEVICE CACHE PROVIDING PHYSICAL MEMORY FOR GUEST VM

(71) Applicant: EMC Corporation, Hopkinton, MA (US)

(72) Inventor: Vitaly Mayatskikh, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 14/317,202

(22) Filed: Jun. 27, 2014

(51) Int. Cl.
*G06F 3/06* (2006.01)
*G06F 17/30* (2006.01)
*G06F 12/0802* (2016.01)
*G06F 12/08* (2016.01)

(52) U.S. Cl.
CPC .......... *G06F 3/0667* (2013.01); *G06F 3/0604* (2013.01); *G06F 3/0643* (2013.01); *G06F 3/0683* (2013.01); *G06F 12/0802* (2013.01); *G06F 12/08* (2013.01); *G06F 17/30233* (2013.01); *G06F 2212/151* (2013.01); *G06F 2212/152* (2013.01); *G06F 2212/657* (2013.01)

(58) Field of Classification Search
CPC .. G06F 2212/657; G06F 3/0667; G06F 3/604; G06F 3/0683; G06F 12/0802
See application file for complete search history.

(56) References Cited

U.S. PATENT DOCUMENTS

| | | | | |
|---|---|---|---|---|
| 9,251,090 B1* | 2/2016 | Borthakur | ........... | G06F 12/1009 |
| 9,612,966 B2* | 4/2017 | Joshi | ................... | G06F 12/0875 |
| 2011/0231857 A1* | 9/2011 | Zaroo | ................... | G06F 9/4881 718/104 |
| 2011/0296411 A1* | 12/2011 | Tang | .................... | G06F 9/45545 718/1 |
| 2012/0089783 A1* | 4/2012 | Tsirkin | ................ | G06F 12/0862 711/125 |
| 2013/0031312 A1* | 1/2013 | Jones | .................. | G06F 12/0862 711/137 |
| 2013/0326186 A1* | 12/2013 | Shaikh | ................ | G06F 11/1435 711/170 |
| 2013/0332676 A1* | 12/2013 | Kotla | .................. | G06F 12/0848 711/129 |
| 2015/0261457 A1* | 9/2015 | Hechtman | ............. | G06F 3/0619 710/308 |

* cited by examiner

*Primary Examiner* — Ann J Lo
*Assistant Examiner* — Masud Khan
(74) *Attorney, Agent, or Firm* — BainwoodHuang

(57) ABSTRACT

Physical memory of a storage processor is organized into a general section and a cache section, where the general section is available as machine memory for instructions and data of an operating system, and the cache section is unavailable as machine memory to the operating system and used by privileged components for caching storage data in connection with processing of storage I/O requests. A cache manager operates with a virtualizing component to allocate and organize units of the cache section into guest physical memory for a guest virtual machine executing on the storage processor. Upon the guest virtual machine accessing memory in a guest virtual memory address space, corresponding physical memory accesses of the guest physical memory are performed. The virtualizing component is a virtual machine monitor such as the kernel virtual machine (KVM) extension of Linux®.

16 Claims, 5 Drawing Sheets

STORAGE PROCESSOR WITH DEVICE CACHE PROVIDING PHYSICAL MEMORY FOR GUEST VM

BACKGROUND

The present invention relates to the field of data storage systems, and in particular to data storage controllers of data storage systems providing data storage services to external requestors such as host computers.

Data storage controllers employ storage processors executing specialized programs for processing data storage commands from requestors such as host computer systems, as well as accessing data storage devices such as disk drives as necessary to write/read user data to/from the data storage devices as part of processing the data storage commands. A data storage processor may implement an in-memory cache, such as a block cache or file cache, for caching data read from or being written to the data storage devices. Such a cache is referred to herein as a "device cache" to distinguish it from other caches such as CPU caches. The storage processor preferentially writes/reads data to/from the device cache instead of a backing storage device when possible for improved performance in processing the data storage commands. The in-memory device cache may occupy the same physical memory used to store instructions and data of an operating system and other operating programs executing on the storage processor.

SUMMARY

In data storage controllers of the above type, it is necessary to manage the different uses of physical memory, such as for the in-memory device cache, the instructions and data of the host operating system, and the instructions and data of other operating programs. In one arrangement, management of the in-memory device cache is performed by one of the operating programs, referred to herein as a "cache manager", while the remainder of the storage processor physical memory is managed by the host operating system. This division of responsibility provides a good balance between efficiency and performance. The use of the device cache for processing storage commands is highly specialized and affects overall performance of the data storage system, and thus the management of the device cache is better performed by the specialized cache manager. The remaining, more general-use, part of physical memory can be managed effectively by the more general-purpose memory management functions of the host operating system.

In one embodiment, the mechanism by which the memory is divided into two parts—a cache section managed by a cache manager and the more general-purpose section managed by the host O/S—is as follows. A Linux kernel is booted with an additional parameter set: mem=X, where X is the amount of memory the O/S is allowed to use. The O/S will then use only first X units of memory (megabytes, gigabytes) regardless of the actual memory size. When the cache manager is loaded and executes, it looks directly at the physical memory map, logically removes the O/S-allocated memory, and uses the remainder of the physical memory as the cache section.

It may be desired to deploy one or more supplemental application programs on a data storage controller to provide additional storage-related functionality beyond that provided by a base set of operating programs of a data storage device. In one example, a customer of a storage vendor might wish to deploy an application owned by the customer on a data storage system that the customer has purchased from the storage vendor. The data storage system from the storage vendor includes the base set of operating programs, so the customer application is an add-on. In this situation it becomes necessary to account for the memory needs of such a supplemental application in the organization of the memory management regime in a storage processor. The supplemental application may be deployed within a virtual machine and require an amount of physical memory between hundreds of megabytes and tens of gigabytes. Additionally, from the perspective of the storage vendor not all of its customers may need to deploy their own applications, so the memory management regime ideally provides flexibility and does not impose undue performance or other penalties in the base configuration.

Examples of supplemental applications include a custom or proprietary file system driver, for example, to overcome design limits of the standard built-in file system (such as maximum size of file system). Other examples include applications providing custom data replication mechanisms; data encryption; custom integration into the IT infrastructure of organization; and latency-sensitive applications that are preferably located as close as possible to the stored data that such applications use.

While it would be possible to use the general-purpose memory management facilities of the operating system to allocate physical memory for use by a supplemental application or virtual machine as described above, such a solution has undesirable drawbacks. A larger portion of the physical memory must be assigned for management by the host operating system, reducing the amount of physical memory available for the caching function. When the division of physical memory is established by a low-level mechanism when the storage system is manufactured or initially configured, it may be impractical to modify it in the field. If the manufacturer divides memory to accommodate supplemental applications, then device cache performance suffers unnecessarily for those customers who do not deploy such applications. If the manufacturer's division does not account for the supplemental applications, then they are forced to share the limited general-purpose memory with the host operating systems and other users, potentially creating other significant performance issues. In some cases it might even be impossible to provide memory in such a manner, because the host O/S has an almost absolute minimum of physical memory required to boot and run.

Disclosed is a technique by which physical memory can be flexibly assigned for use by a supplemental application and/or virtual machine in a data storage processor by selectively obtaining units of physical memory from a cache section that is managed by a cache manager rather than the operating system. In this description, the specific term "host operating system" is used to refer to the machine operating system executing on the data storage processor, as distinct from a "guest" operating system that may be executing in a virtual machine. The disclosed technique provides for more dynamic assignment of physical memory as needed to support variable features such as supplemental applications, and better opportunities for optimizing the allocation of memory in a variety of distinct configurations of the data storage system.

More particularly, a method is disclosed of operating a storage processor of a data storage controller coupled to data storage devices. The method includes organizing a physical memory of the storage processor into a general section and a cache section, where the general section is available as machine memory to a host operating system to store instructions and data of the host operating system, and the cache section is unavailable as machine memory to the host operating system and is used by privileged components executing on the storage processor for caching data of the storage devices in connection with processing of storage I/O requests. The privileged components include a cache manager independently controlling use of the cache section.

The cache manager operates along with a virtualizing component executing on the storage processor to allocate and organize units of the cache section into guest physical memory for use by a guest virtual machine executing on the storage processor under control of the virtualizing component. The guest physical memory is mapped to a guest virtual memory address space of the guest virtual machine. In response to the guest virtual machine accessing memory in the guest virtual memory address space, corresponding physical memory accesses of the guest physical memory are performed according to the organization of the units of the cache section into the guest physical memory. In one example the virtualizing component is a kernel virtual machine or KVM extension of the Linux® operating system that functions as a virtual machine monitor for the guest virtual machine.

By the above technique, physical memory can be selectively obtained from the cache section as needed to support the application executing in the guest virtual machine. It is not necessary to account for the potential memory needs of the application and guest virtual machine in making the lower-level division of physical memory into the cache and general sections.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
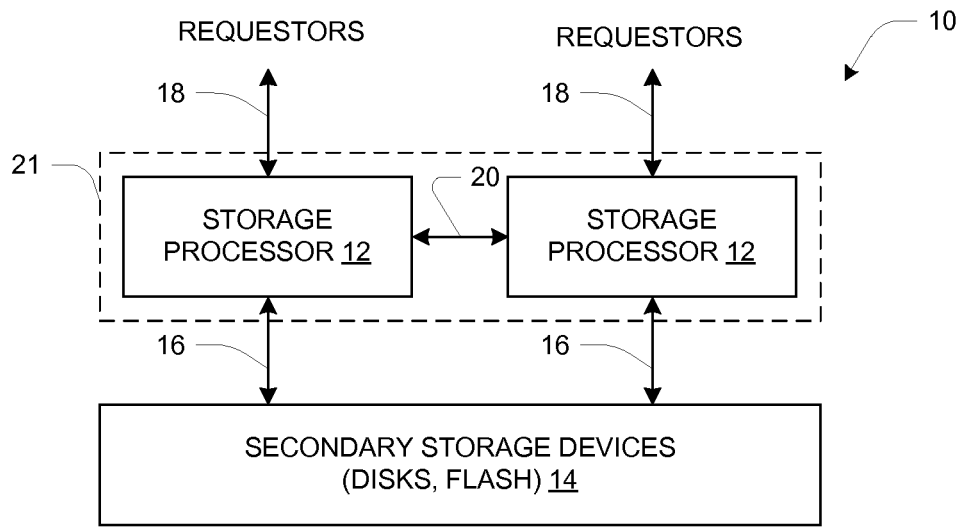
FIG. 1 is a block diagram of a data storage system.

FIG. 1 shows a data storage system 10 including a pair of storage processors 12 connected to a set of secondary storage devices 14 such as magnetic disk drives, Flash memory arrays, etc. by storage-oriented connections 16 (e.g., SCSI, FibreChannel etc.). The storage processors 12 are also connected to external requestors such as host computers (not shown) via connections 18. The connections 18 may be part of a storage-area network or SAN, or they may be part of a more general-purpose network, which may be either private or public and may be either local or wide-area in scope. In this latter configuration, the data storage system 10 may be referred to as "network attached storage" or NAS.

As indicated in FIG. 1, the collection of storage processors 12 form a data storage controller 21 of the data storage system. In some embodiments including the VNX embodiments mentioned below, the storage controller 21 is packaged together with the secondary storage devices 14 in one or more integrated enclosures that form a single storage system product. In other embodiments, the storage controller 21 and secondary storage devices 14 may be packaged separately, in which case the storage controller 21 may reside in an appliance product that may be used with a separate storage device product housing the storage devices 14.

In operation, each storage processor 12 responds to storage requests received from the external requestors by performing corresponding storage write and read operations to/from the secondary storage devices 14 via the storage-oriented connections 16, and in the case of read operations then returning data to the requestors. As described more below, the storage processors 12 employ memory-based device caches for increased performance. The storage processors 12 may provide a wide array of storage-related functionality including services such as replication, encryption, load balancing, failover, etc., some of which may utilize an inter-storage-processor data bus 20 for data and other transfers between the storage processors 12. In the description below, a storage processor 12 may be referred to using the acronym "SP".

Example products having an organization like that of FIG. 1 include VNX® and VNXe® data storage systems sold by EMC Corporation.

Figure 2:
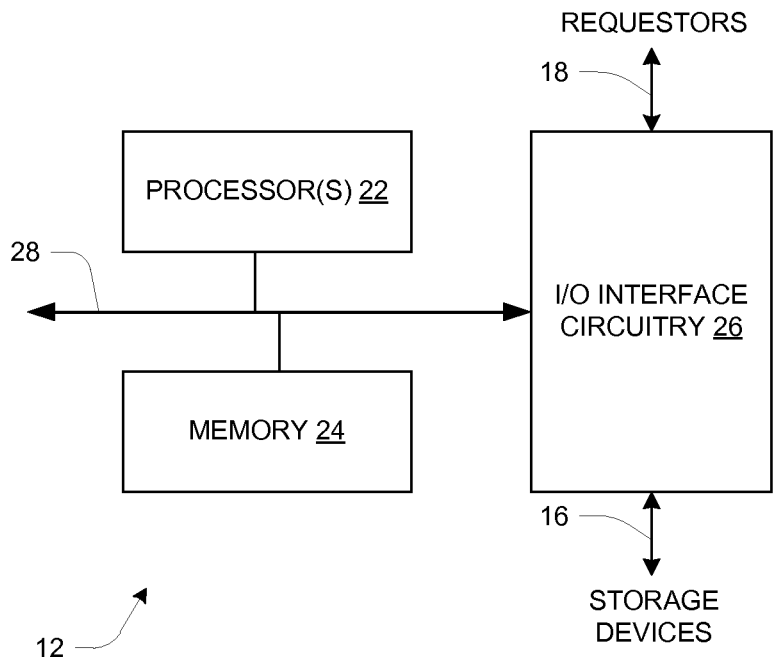
FIG. 2 is a block diagram of a storage processor from a hardware perspective.

FIG. 2 shows the structure of a storage processor 12 from a hardware perspective. It includes a set of processors 22, memory 24 and I/O interface circuitry 26 connected together by one or more high-speed data buses 28. The I/O interface circuitry 26 provides the hardware-level interfaces to the connections 16 and 18. The processors 22 execute computer program instructions stored in the memory 24 to realize various functional components such as an operating system and specialized storage-related components for processing storage requests, engaging in data transfers with the storage devices 14, providing the storage-related services such as those described above, etc. The memory 24 serves as primary memory (RAM) used by the operating system and functional components for storage and retrieval of instructions and data. Additional detail is provided below.

The size of the memory 24 may vary in different embodiments. In versions of the above-mentioned VNX and VNXe products available in 2014, the size can range from 24 GB per SP 12 (lower-end products) to 128 GB per SP 12 (higher-end products). As described more below, the memory 24 includes a large area dedicated to use as one or more device caches. A device cache is used to temporarily store user data being written to or read from the storage devices 14, enabling data to be gathered/retrieved in batches for more efficient transfer to/from the storage devices 14. Individual write and read requests from the requestors are satisfied from the device cache when possible. Other in-memory caches are used for various forms of "metadata", i.e., data that is generally not user visible but commonly accessed by the functional components of the storage processors 12 in performing their operations. Examples of such metadata include various on-disk data of file systems, service-related data, data used in managing the device caches, etc.

Figure 3:
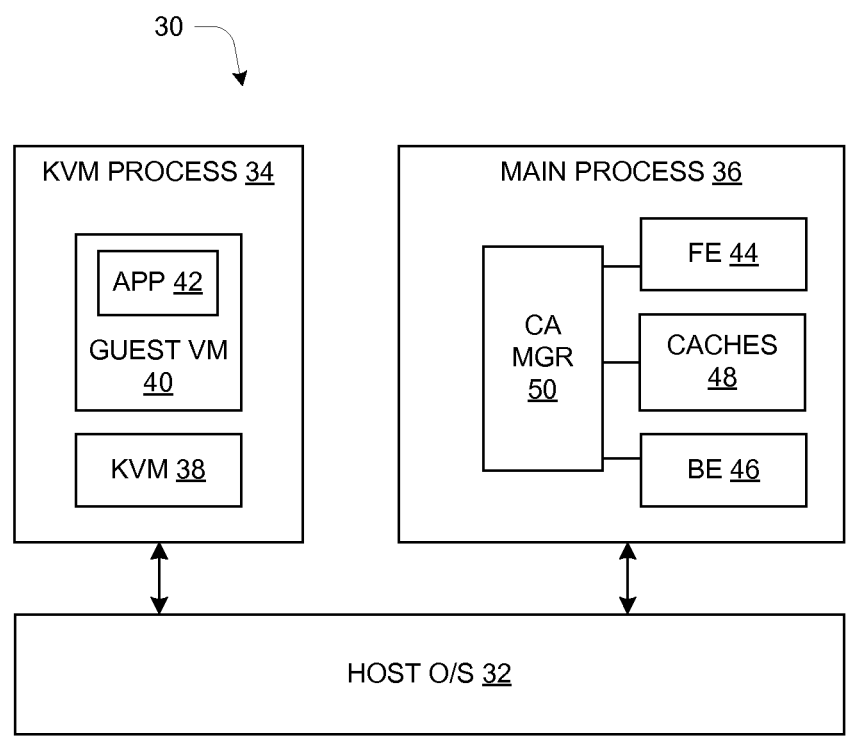
FIG. 3 is a block diagram of a storage processor from a software perspective.

FIG. 3 shows pertinent structure 30 of software-implemented operating components of a storage processor 12. It includes a host operating system (O/S) 32 and components shown as executing in separate processes, a KVM process 34 and a main process 36, which have distinct virtual memory address spaces. Executing in the KVM process 34 is a kernel virtual machine (KVM) 38 and a guest virtual machine (VM) 40 with one or more applications (referred to with the singular "APP") 42. The guest VM 40 typically includes a guest O/S, which is omitted from FIG. 3. The components in the main process 36, also referred to as "core components", are shown in a simplified way as including front-end (FE) components 44, back-end (BE) components 46, and cache components 48, along with a cache manager (CA MGR) 50. The FE components 44 receive incoming requests, process cache hits to completion and return responses to the requestors. The cache components 48 handle cache lookups and writes/reads to/from one or more device caches. The BE components 46 engage in data exchanges with the storage devices 14, performing reads in response to cache read misses and performing writes when de-staging data from cache to disk. They also provide RAID as well as other services as generally known in the art.

Some components of the main process 36 are privileged components that can interact directly with hardware resources of the storage processor 12 without mediation by the host OS 32. In particular, the cache manager 50 has direct control over a large portion of the physical memory 24 (FIG. 2) and manages the device caches stored therein to the exclusion of the host O/S 32. This is described in more detail below.

The KVM 38 is a virtualizing component providing virtualization of machine resources to one or more guest virtual machines in support of virtual-machine computing as generally known in the art. In one embodiment, KVM 38 is a kernel-layer extension to the Linux® operating system that enables it to function as a hypervisor or virtual machine monitor (VMM). One aspect of KVM 38 is its ability to support memory allocation via file mapping, a technique used in one embodiment as described more below. In the illustrated embodiment, KVM 38 supports one or more guest VMs 40 on which the application(s) 42 are deployed. This organization can provide flexibility in configuring the data storage system 10 for use in different environments. The standard or base functionality can be realized by the main process 36, and in environments requiring only this level of functionality then only the components of the main process 36 are resident and executing. Other environments require the additional functionality of the application(s) 42, and in these cases the components of the KVM process 34 are also resident and executing. The virtual-machine organization provides modularity and relative ease of integrating the applications 42 into a system.

Figure 4:
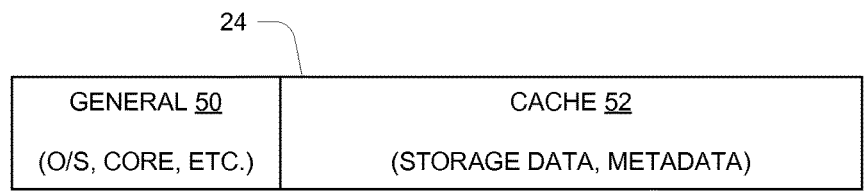
FIG. 4 is a schematic depiction of an organization of physical memory.

FIG. 4 shows an arrangement of the physical memory 24 of a storage processor 12. It is divided into a general section 50 and a cache section 52. These are used as described above, i.e., the general section 50 for the host O/S 32 as well as instructions and some data of the core components, and the cache section 52 is used for device caches and metadata caches. As generally known in the art, the processors 22 (FIG. 3) employ virtual memory addressing which involves a managed use of physical memory and a mapping of virtual memory addresses to physical memory addresses. Memory is managed in units referred to as "pages" whose size may vary among different processor architectures and deployments. One common page size is 4 KB. While the processor hardware provides the translation of virtual memory addresses to physical memory addresses at the speed of instruction processing, it does so using page tables and other data structures and mechanisms provided by memory management software. In the illustrated arrangement, the general section 50 of the memory 24 is managed by the host O/S 32, while the cache section 52 is managed by the cache manager 50. From the perspective of the memory manager of the host O/S 32, the main process 36 is one large and monolithic user of physical memory 24.

It is necessary to provision the guest VM 40 with physical memory as needed for execution of the guest O/S and application(s) 42. One straightforward way would be to use the general section 50 and the memory management mechanisms of the host O/S 32. However, there can be drawbacks to such an approach. In the event that the memory division of FIG. 4 is relatively fixed, then it would be necessary for the general section 50 to be sufficiently large to adequately accommodate the needs of the guest VM 40 and app 42, but then this additional capacity would be wasted in the standard/base configuration not utilizing these components. In particular, the size of the cache section 52 would be smaller than necessary, reducing performance.

Figure 5:
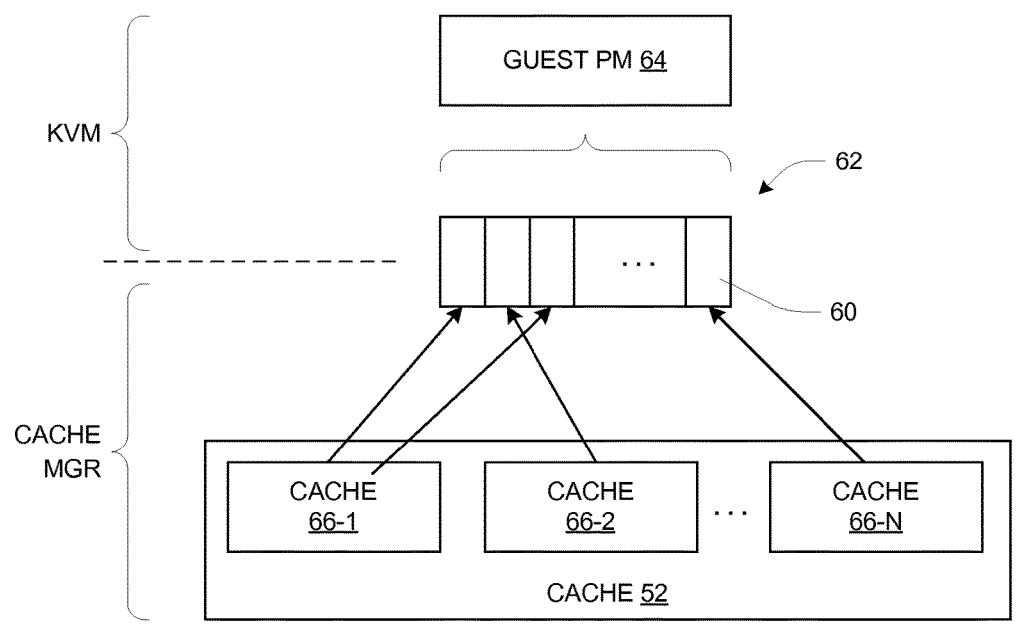
FIG. 5 is a schematic depiction of a first technique for providing guest physical memory from a cache section of physical memory.

FIG. 5 depicts an alternative approach to supplying the guest VM 40 with physical memory. In this approach, memory pages or similar units 60 are obtained from the cache section 52 and used to form a pool 62 of physical memory, which is used by the KVM 38 to present guest physical memory (PM) 64 to the guest VM 40 (FIG. 3). It will be understood that this depiction is of a logical scheme realized by manipulation of data structures and addressing, not by any physical dividing or rearranging of the storage processor physical memory 24. The units 60 are taken from individual caches 66 within the cache section 52, which may include one or more block caches, file caches, etc. In support of this approach, the cache manager 50 in one embodiment supports a custom application programming interface (API) used by the KVM 38 to create and manage the pool 62. For example, the API may include get_page( ) and put_page( ) functions by which the KVM 38 obtains new pages from a cache 66 or returns pages from the pool 60 to a cache 66. In this case the KVM 38 includes specialized components for managing the mapping between the pool 62 and the guest PM 64 as well as for interacting with the cache manager 50 using the API. When a VM 40 is instantiated, for example, the KVM 38 uses the API of the cache manager 50 to obtain a sufficient number of pages 60 to constitute a sufficiently large guest PM 64. If the VM 40 is later removed, the KVM 38 can return pages of the pool 62 to the cache section 52 using the cache manager API. The techniques by which the KVM 38 presents the guest PM 64 to the guest VM 40 are generally known and not elaborated further herein.

It is noted that the cache memory may itself be organized as a collection or pool of objects or units of memory, and that the memory behind a single object may be determined by address and length and not necessarily be page-aligned. Thus, the API might preferably allocate objects, combine them in contiguous memory chunks where possible, and pass only page-bounded portion of objects to the pool 62. In that case, head and tail portions of object's memory will not be available to either a cache or the pool 62 during the existence of the corresponding VM.

The approach of FIG. 5 has both a general nature and certain specifics. In general in the disclosed technique, units 60 of memory are obtained from the cache section 52 and placed into a pool 62 from which the guest PM 64 is formed. FIG. 5 also shows a specific arrangement in which this structure and functionality are provided by the KVM 38 and cache manager 50 in direct communication with each other.

Figure 6:
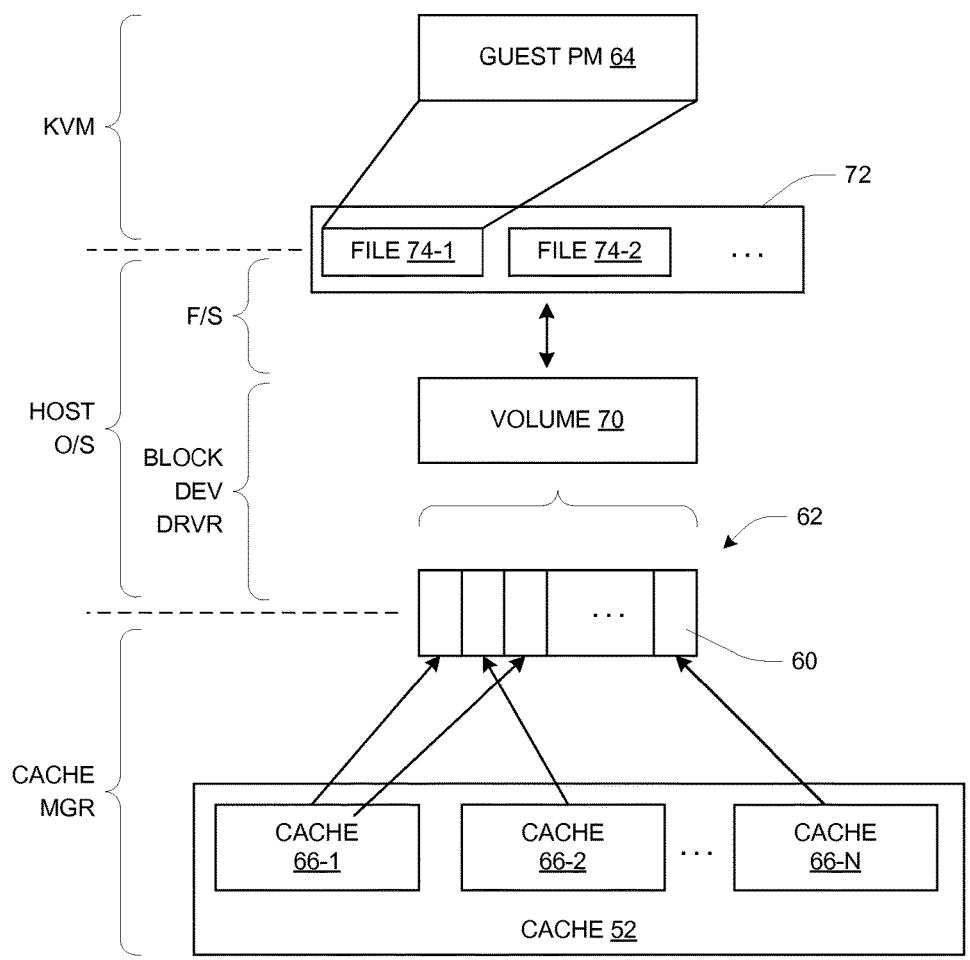
FIG. 6 is a schematic depiction of a second technique for providing guest physical memory from a cache section of physical memory.

FIG. 6 shows a different specific arrangement that may be used. As in FIG. 5, a pool 62 is used. In this arrangement the pool 62 is further organized into a logical storage volume 70 on which a file system (F/S) 72 and its constituent files 74 are stored. The guest PM 64 is mapped by KVM 38 to a file 74. As shown, this arrangement uses additional components of the host O/S 32, namely a file system (F/S) component and a specialized block device driver (BLOCK DEV DRVR) that provides the volume 70 abstraction of the pool 62 to the overlying F/S. In this case, the block device driver is the user of the above-described API of the cache manager 50. In operation, there is an initial bottom-up set of operations in which (1) the pool 62 is populated from the cache section 52, (2) the volume 70 using the pool 62 as underlying storage is defined and presented to the F/S 72, and (3) KVM 38 creates a file 74 in the F/S 72 and maps it to the guest PM 64 for use by the guest VM 40. It should be noted that the block device abstraction is generally unnecessary for file systems that are specially purposed to be RAM-resident, for example tmpfs and pramfs. More general-purpose file systems, such as ext2 or xfs, can be used, but they require the underlying block device. Either of these approaches can be used for VM memory provisioning.

One benefit of the arrangement of FIG. 6 is leveraging the ability of the KVM 38 to map memory to files. Much of the remaining functionality can be realized by the specialized block device driver or file system driver, which is a discrete component that can easily be incorporated into an instance of the host O/S 32. This is in contrast to the arrangement of FIG. 5, which may require more involved modification of kernel components of the host O/S 32 to support use of the pool 62 for guest PM 64.

Figure 7:
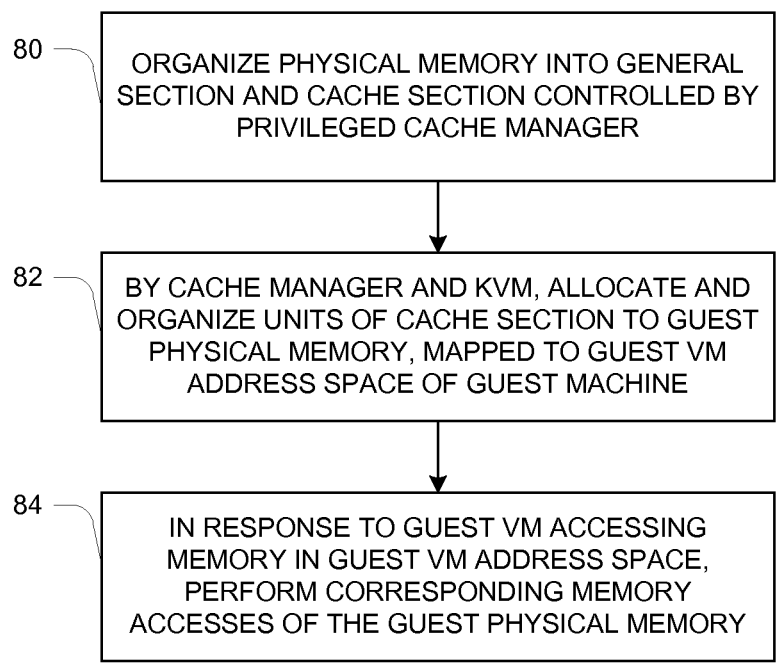
FIG. 7 is a flow diagram of high-level operation for providing guest physical memory from a cache section of physical memory.

FIG. 7 is a high-level flow of key aspects of operation. At 80, the physical memory 24 of an SP 12 is organized into a general section 50 and a cache section 52, where the cache section 52 is controlled/managed by a privileged cache manager 50. This organization may be established by basic configuration parameters of the SP 12, applied by firmware or higher-level software during each cold startup. At 82, the cache manager 50 and KVM 38 (or other VMM) co-operate to allocate and configure units of the cache section 52 to the guest PM 64 which is mapped within a guest VM 40 to the guest VM address space. Different schemes may be used, such as that of FIG. 5 or that of FIG. 6 for example. Then at 84, in response to the guest VM 40 accessing memory in the guest VM address space, corresponding allocated units 60 from the cache section 52 are accessed according to (1) the mapping of guest VM addresses to guest PM addresses by the guest VM 40, and (2) the further mapping between the guest PM 64 and the allocated units 60 from the cache section 52 according to the scheme being used. In the scheme of FIG. 5, this mapping is directly from guest PM 64 to the pool 62 and thence to individual pages/units 60 of the cache section 52. In the scheme of FIG. 6, the mapping to file(s) 74 and the volume 70 are also included in the mapping between the guest PM 64 and the allocated units 60.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a storage processor of a data storage controller coupled to data storage devices, comprising:
   organizing a physical memory of the storage processor into a general section and a cache section, the general section being available as machine memory to a host operating system to store instructions and data of the host operating system, the cache section being unavailable as machine memory to the host operating system and being used by privileged components executing on the storage processor for caching data of the storage devices in connection with processing of storage I/O requests, the privileged components including a cache manager independently controlling use of the cache section;
   by the cache manager and a virtualizing component executing on the storage processor under control of the host operating system, allocating and organizing units of the cache section into guest physical memory for use by a guest virtual machine executing on the storage processor under control of the virtualizing component, the guest physical memory being mapped to a guest virtual memory address space of the guest virtual machine; and
   subsequently in response to the guest virtual machine accessing memory in the guest virtual memory address space, performing corresponding physical memory accesses of the guest physical memory,
   wherein the storage processor executes distinct processes having corresponding distinct virtual memory address spaces, the distinct processes including a kernel virtual machine (KVM) process and a main process, the KVM process executing the guest virtual machine as well as a kernel virtual machine as the virtualizing component, the main process executing the privileged components including the cache manager, as well as (1) a front-end component that (i) receives incoming requests, (ii) processes cache hits to completion and (iii) returns responses to the requestors, (2) cache components that handle cache lookups and writes/reads to/from one or more device caches, and (3) back-end components that engage in data exchanges with the storage devices including reads in response to cache read misses and writes when de-staging data from cache to disk.

2. A method according to claim 1, wherein the units of the cache section are organized into a first layer to form an in-memory storage volume and into a second layer forming an in-memory file system defined on the in-memory storage volume, the in-memory file system including a file to which the guest physical memory is mapped by the virtualizing component as part of organizing the units of the cache section into the guest physical memory.

3. A method according to claim 2, wherein the first layer forming an in-memory storage volume is realized by a block device driver included as a kernel component in the host operating system, the block device driver communicating with the cache manager to obtain the units of the cache section as underlying storage for the in-memory storage volume, and wherein the virtualizing component manages use of the in-memory storage volume for the in-memory file system by generating block device commands processed by the specialized block device driver.

4. A method according to claim 3, wherein the block device driver uses an application programming interface of the cache manager to obtain the units of the cache section, the application programming interface including a get_page command to which the cache manager responds by allocating a unit of the cache section and returning an identification of the allocated unit to the block device driver.

5. A method according to claim 1, wherein allocating and organizing units of the cache section into guest physical memory includes maintaining a pool of allocated units available for allocation to the guest physical memory.

6. A method according to claim 1, wherein the virtualizing component uses an application programming interface of the cache manager to transfer units of the cache section into and out of the pool, the application programming interface including (1) a get_page command to which the cache manager responds by allocating a unit of the cache section to the pool, and (2) a put_page command to which the cache manager responds by de-allocating a unit of the cache section from the pool and returning it to use for caching data of the storage devices.

7. A method according to claim 1, wherein the cache manager interacts directly with hardware resources of the storage processor without mediation by the host operating system, and wherein the cache manager has direct control over a corresponding portion of the physical memory and manages the device caches stored therein to the exclusion of the host operating system.

8. A method according to claim 1, wherein the kernel virtual machine is a virtual machine monitor providing virtualization of machine resources to the guest virtual machine in support of virtual-machine computing.

9. A method according to claim 8, wherein the organization employing the kernel virtual machine and guest virtual machine provides flexibility in configuring the data storage system for use in different environments by (1) realizing standard or base data-storage functionality by the main process, and (2) realizing additional data-storage functionality by execution of an associated application within the guest VM.

10. A method according to claim 1, wherein the cache section includes (1) a first part including device caches used for the caching of data of the storage devices in connection with the processing of storage I/O requests, and (2) a second part including the units that are organized into the guest physical memory, the units having been obtained by removing them the first part of the cache section.

11. A data storage controller, comprising:
interface circuitry for coupling the data storage controller to a plurality of data storage devices and to one or more host computers, the host computers being sources of data storage commands processed by the data storage controller, and data storage devices being the targets of the data storage commands for storing host data thereon and retrieving host data therefrom; and
a storage processor coupled to the interface circuitry to receive and process the storage I/O requests, the storage processor including one or more processing cores and physical memory coupled to the processing cores, the physical memory storing computer program instructions that, when executed by the storage processor, cause the data storage controller to perform a method including:
organizing the physical memory of the storage processor into a general section and a cache section, the general section being available as machine memory to a host operating system to store instructions and data of the host operating system, the cache section being unavailable as machine memory to the host operating system and being used by privileged components executing on the storage processor for caching data of the storage devices in connection with processing of storage I/O requests, the privileged components including a cache manager independently controlling use of the cache section;
by the cache manager and a virtualizing component executing on the storage processor under control of the host operating system, allocating and organizing units of the cache section into guest physical memory for use by a guest virtual machine executing on the storage processor under control of the virtualizing component, the guest physical memory being mapped to a guest virtual memory address space of the guest virtual machine; and
subsequently in response to the guest virtual machine accessing memory in the guest virtual memory address space, performing corresponding physical memory accesses of the guest physical memory,
wherein the storage processor executes distinct processes having corresponding distinct virtual memory address spaces, the distinct processes including a kernel virtual machine (KVM) process and a main process, the KVM process executing the guest virtual machine as well as a kernel virtual machine as the virtualizing component, the main process executing the privileged components including the cache manager, as well as (1) a front-end component that (i) receives incoming requests, (ii) processes cache hits to completion and (iii) returns responses to the requestors, (2) cache components that handle cache lookups and writes/reads to/from one or more device caches, and (3) back-end components that engage in data exchanges with the storage devices including reads in response to cache read misses and writes when de-staging data from cache to disk.

12. A data storage controller according to claim 11, wherein the units of the cache section are organized into a first layer to form an in-memory storage volume and into a second layer forming an in-memory file system defined on the in-memory storage volume, the in-memory file system including a file to which the guest physical memory is mapped by the virtualizing component as part of organizing the units of the cache section into the guest physical memory.

13. A data storage controller according to claim 12, wherein
the first layer forming an in-memory storage volume is realized by a block device driver included as a kernel component in the host operating system, the block device driver communicating with the cache manager to obtain the units of the cache section as underlying storage for the in-memory storage volume, and wherein the virtualizing component manages use of the in-memory storage volume for the in-memory file system by generating block device commands processed by the specialized block device driver.

14. A data storage controller according to claim 13, wherein the block device driver uses an application programming interface of the cache manager to obtain the units of the cache section, the application programming interface including a get_page command to which the cache manager responds by allocating a unit of the cache section and returning an identification of the allocated unit to the block device driver.

15. A data storage controller according to claim 11, wherein allocating and organizing units of the cache section into guest physical memory includes maintaining a pool of allocated units available for allocation to the guest physical memory.

16. A data storage controller according to claim 11, wherein the virtualizing component uses an application programming interface of the cache manager to transfer units of the cache section into and out of the pool, the application programming interface including (1) a get_page command to which the cache manager responds by allocating a unit of the cache section to the pool, and (2) a put_page command to which the cache manager responds by de-allocating a unit of the cache section from the pool and returning it to use for caching data of the storage devices.

* * * * *